United States Patent [19]

Nijhawan

[11] 3,801,310

[45] Apr. 2, 1974

[54] LEAD ALLOY FOR BATTERY GRID

[75] Inventor: Subash Nijhawan, Schonberg, Germany

[73] Assignee: Varta Aktiengesellschaft, Frankfurt/Main, Germany

[22] Filed: Oct. 16, 1972

[21] Appl. No.: 297,754

[30] Foreign Application Priority Data

Oct. 18, 1971 Germany............................ 2151733

[52] U.S. Cl............................................. 75/166 C
[51] Int. Cl............................................. C22c 11/00
[58] Field of Search ....................... 75/166 C, 166 R

[56] References Cited
UNITED STATES PATENTS

| | | | |
|---|---|---|---|
| 2,148,741 | 2/1939 | Gonser............................. | 75/166 C |
| 2,694,628 | 11/1954 | Carroll............................. | 75/166 C |
| 2,841,491 | 7/1958 | Zahn................................ | 75/166 C |
| 3,144,356 | 8/1964 | Dover.............................. | 75/166 C |

FOREIGN PATENTS OR APPLICATIONS 3,459  6/1954  Japan............................... 75/166 C

*Primary Examiner*—Hyland Bizot
*Assistant Examiner*—E. L. Weise
*Attorney, Agent, or Firm*—Weiser & Stapler

[57] ABSTRACT

Lead alloy for the grids of lead storage batteries, which alloy has a low antimony content and which comprises from 1.0 to 3.5 per cent by weight Sb; 0.025 to 0.2 per cent by weight As, 0.005 to 0.1 per cent by weight Se, 0.01 to 0.05 per cent by weight Sn and the remainder lead.

Preferably the alloy contains also 0.025 to 0.1 per cent by weight silver.

12 Claims, No Drawings

LEAD ALLOY FOR BATTERY GRID

The present invention relates to lead alloys for the grids of lead storage batteries and more specifically to a novel grid for a lead storage battery and to the battery itself.

Generally, the grids of lead storage batteries are made from a lead — antimony alloy, which contains from about 6 to about 11 per cent by weight Sb. Pure lead in itself is too soft and does not have the properties for casting therefrom storage batteries in commercial scale operations. The antimony in the above mentioned lead — antimony alloys serves the purpose of providing to the lead the required strength and casting properties.

However, the antimony is a material which, because of its relatively high price, substantially increases the cost of the battery grids and of the batteries. Furthermore, the rate of self-discharge of the batteries on standing increases with increasing antimony content of the grids. Also the gas generation of the batteries increases undesirably with increasing antimony content of the grids and the migration of antimony ions to the negative electrode of the battery during its operation results in a gradual poisoning of the negative electrode.

It is therefore an object of the invention to improve the performance and operation of the lead storage battery by decreasing the antimony content of the grids as much as possible without loss of other favorable properties provided by the antimony.

Another object is to make available lead storage batteries at a low cost.

Other objects will become apparent from the following description of the invention and from the claims.

Lead-antimony alloys having a lower than conventional antimony content still provide the desired strength, but in practice grids containing, for instance, 1.5 to 3.5 per cent by weight antimony do not function well in lead storage batteries because of their tendency for cracking and because of their brittleness. This is apparently caused by coarse dendritic solidification and casting faults resulting therefrom, such as discontinuities, microporosity, etc.

In connection with attempts at lowering the antimony content in the battery grids as much as possible, a lead alloy is proposed in U.S. Pat. No. 2,148,741 which contains Sb, Sn and As or Cu or Se. A lead alloy which contains, for instance, only As and Cu, presents a considerable tendency for cracking and a substantial degree of brittleness. On the other hand, with the addition of Se, the required hardness is obtained only at higher antimony contents of more than 6 per cent by weight with the above described disadvantages caused by the high antimony content still being present.

It was also proposed in British Patent 622,512 to produce the positive grids in lead storage batteries from an alloy of lead with 1 to 5 per cent by weight antimony and with the addition of 0.005 to 0.5 per cent by weight Se. The selenium addition was intended to reduce or eliminate the tendency of the grids to crack upon cooling after casting.

It was found that the lead alloys, which are low in antimony content and have, for instance, 1 to 3.5 per cent by weight antimony, do not show the cracking in the cast state. The grids made from these alloys are, however, too soft and are therefore not suitable for processing into finished storage battery grids. When the grids are heat treated for achieving the required hardness, for instance, by solution treatment (solution heat treatment) with subsequent cold storage, the tenacity decreases and the grids become brittle and break under mechanical stress.

This shows that the alloys in accordance with the said British Patent are too soft, required too long a time for hardening, and if subsequent heat treatment is employed to achieve the required tenacity, become brittle.

In British Patent 1,105,548 there are described lead alloys for battery grids which do not contain antimony and which consist of Pb, Te, Ag and As. Such alloys are generally also too soft and were, therefore, not acceptable in the lead storage battery industry.

The present invention provides new lead-antimony alloys which are low in antimony content and which do not have the disadvantages of the prior art. The new alloys can be readily cast to form the grids without requiring a heat aftertreatment, which normally tends to decrease the toughness and tenaciousness of the grids. The grids cast from the new alloys of the invention achieve the required hardness, tenacity and tenaciousness simply by air cooling the freshly cast grids or by spraying them with water. Furthermore, the new lead alloys of the invention facilitate also the production of thin grids for example for starter batteries, by maintaining the casting properties and the productivity of the casting operation at the desired high levels. The new lead alloys of the invention make also possible an increase of the corrosion resistance of the grids, which is of highest importance with such grids which are subjected to high electrochemical demands.

The objects of the invention are achieved by a new lead alloy which comprises 1.0 to 3.5 per cent by weight Sb, but in no event more than 5 per cent by weight Sb, 0.025 to 0.2 per cent by weight As, 0.005 to 0.1 per cent by weight Se, 0.01 to 0.05 per cent by weight Sn and the remainder being lead. It is of particular advantage to add to the alloys, for use in positive grids of commercial lead storage batteries and for use in thin, positive starter grids, small amounts of silver in a proportion of 0.025 to 0.1 per cent by weight Ag.

The addition of silver in the described small proportions stabilizes the fine structure of the alloy, increases the corrosion resistance, suppresses the formation of coarse grains in a heat treatment and suppresses discontinuous precipitation, which would result in a reduction of the tenaciousness.

For industrial and starter grids subject to heavy loads, lead alloys which contain, for instance, 2.2 to 2.8 per cent by weight Sb, 0.03 to 0.06 per cent by weight As, 0.01 to 0.04 per cent by weight Se, 0.015 to 0.03 per cent by weight Sn, and which contain as the remainder lead, were found to be most suitable. These alloys may also preferably be provided with small amounts of silver in the range from 0.03 to 0.06 per cent by weight.

Lead storage battery grids require for further processing a minimum hardness HB (25 kp/ 5 −30) of 11 to 13 kg/mm$^2$. In the case of lead-antimony alloys the natural hardness of the grids exceeds the required hardness only at antimony contents of 6.5 per cent by weight Sb or higher. In the case of lead-antimony alloys containing from 1.5 to 6.5 per cent by weight Sb, the differential between the natural hardness and the required hardness can be overcome by a age-hardening.

This hardness differential between natural hardness and required hardness can be eliminated, for instance, in the case of lead-antimony alloys which have a low antimony content, by a age-hardening treatment including a heat treatment, e.g. solution treatment at temperatures higher than 225° C, with subsequent storage for a reasonable holding time of, for instance, one week. The solution treatment can be effected, for instance, at a temperature in the range from 225° to 250° C. Thereby solution tempering times of, for instance, 30 to 60 minutes are required to achieve the desired hardness.

The content of Se in the alloy eliminates cracking. The addition of Se has, however, barely an effect on the tenacity. The content of As makes possible to eliminate a heat after-treatment which would reduce the tenaciousness of the grids. The content of Sn results in a substantial increase of the casting ability and an increase of the production rate by casting. The presence of Ag in the alloy of the invention results in a stabilization of the fine structure of the alloy, an increase of the toughness and tenaciousness of the grids and in an increase of the corrosion resistance.

For economical commercial mass production of storage battery grids, it is required that the desired tenacity of the grids be achieved in a short period of time. A content of about 0.05 per cent by weight As in the alloy of the invention has an optimum effect with regard to the increase of the speed and amount of hardening. This stems from the fact that this amount of As effects the maximum solubility in the crystal lattice of the lead, which in turn has an optimum effect in the hardening process. Any excess over 0.05 per cent by weight As forms a heterogeneous phase. This heterogeneous phase disturbs the age hardening, so that the increase in tenacity achieved by the addition of As decreases as the amount of the As exceeds 0.05 per cent by weight.

The amount of 0.02 per cent by weight Sn represents also an optimum. With contents of 0.01 to 0.03 per cent by weight of Sn the spreadability of the molten alloy and the output in a casting operation are considerably improved. If the amount of Sn drops below about 0.01 per cent by weight, the favorable effect is lost. If the amount of Sn exceeds about 0.03 per cent by weight, after-dripping and filament formation can be observed in the molten alloy.

The addition of As results in an increase of the speed as well as of the amount of hardening. While alloys containing no As permit reduction of the solution tempering temperature to only about 225° C for the achievement of the desired hardness, the As containing alloys of the invention result in the required hardness at temperatures as low as about 200° C. The grids when taken from the casting mold have a temperature of from about 200° C to about 225° C. This reduction of the temperature at which hardening occurs has considerable economical advantages, because a separate heat after-treatment can be dispensed with under these circumstances with the alloys of the invention. The As-containing alloys of the invention achieve the desired hardness in reasonably short storage times. By spraying the grids with water, right or reasonably soon after they are taken from the mold, the amount and speed of the hardening can still be further increased. Or, alternatively, with this procedure, the antimony content can be still further reduced. It is possible to make grids which contain As and Se and about 2 per cent by weight Sb and give them the required hardness by storage at room temperature for about one week after casting. Similar grids containing as low at 1.5 per cent by weight Sb achieve the required hardness after spraying them with water after casting and storing them for about one week at room temperature. The addition of Sn to the alloy results in an improvement of the casting ability and in an increase of the casting productivity. The addition of Ag to the alloy effects stabilization of the fine structure and an increase of the corrosion resistance.

The combination of the components Pb, Sb, As, Se, Sn and optionally silver, proposed in accordance with the invention, makes it possible to increase — at low Sb contents not exceeding about 3.5 per cent by weight —, the tenacity and strength of the grids without losing thereby the stretchability of about 5 percent and without losing the required tenaciousness. Furthermore, the casting ability and the casting productivity are substantially improved and the corrosion resistance is increased. A heat aftertreatment of 15 to 60 minutes duration at 200° to 245° C, and spraying with water or submersion of the hot grid in water, makes possible to achieve hardness values up to about 28 kg/mm$^2$.

The increased solution treatment temperature employed in such heat after-treatment and the lengthened time of the heat treatment, with subsequent storage at room temperature, decrease the stretchability and the tenaciousness in the case of lead-antimony alloys which are low in Sb-content and which contain As, Se and Sn. The reduction of the stretchability is caused by the formation of coarse grains during the solution treatment and by discontinuous precipitation during the storage after-treatment. In the alloys of the invention the speed or rate of migration of grain boundaries during the solution treatment, as well as the rate or speed of the discontinuous precipitation during the storage after-treatment, are greatly reduced. By reducing the rate of migration of the grain boundaries, the formation of coarse grains is held within acceptable limits. The reduction of the rate of discontinuous precipitation has the effect that continuous precipitation predominates, thus displacing to a great part the discontinuous precipitation. A considerable suppression of the discontinuous precipitation is also possible by storage of the grids at higher temperatures, e.g. up to 100° C. This applies also those alloys which do not contain silver. However, in the absence of silver the formation of coarse grains proceeds during the heat treatment.

Omission from the alloys embodying the invention of even one of the four principal non-lead ingredients; namely Sb, As, Se or Sn, in the proportions specified, materially lessens one or more desirable properties of the alloy, including freedom from cracking, tenaciousness, casting ability, and freedom from the need for heat after treatment.

The proportions of the various ingredients were determined empirically, by experimentation. Both below and above the ranges specified, the desirable properties fall off sharply.

For example, at Sb value, below 1.5 per cent by weight intensive heat treatment is necessary, while at Sb value, above 3.5 per cent by weight the advantages of low Sb content drastically diminish.

At As value, 0.005 per cent by weight, there ceases to be any substantial enhancement by tenacity, while above 0.2 per cent by weight the tenacity again declines, and so does the corrosion resistance.

At Se values below 0.005 per cent by weight, the fine grain structure diminishes so that the tenaciousness declines sharply, while above 0.1 per cent by weight corrosion resistance again sharply declines.

At Sn values below 0.01 per cent by weight, the desirable properties pertaining to spreadability and to casting ability are impaired, while above 0.03 per cent and even more so above 0.05 per cent dripping and fiber formation take place. It is noted that these are low values in Sn content compared to what is customarily employed, as for example in U.S. practice.

In all cases, exceeding the value specified is also disadvantageous because it leads to a needlessly costly product.

When incorporated into batteries, the grids embodying the invention impart to the batteries a number of desirable properties including lower gas evolution, water consumption, self-discharge and corrosion, as well as extended life.

I claim:

1. A lead alloy for grids of lead storage batteries, which alloy comprises 1.0 to 3.5 per cent by weight Sb, 0.025 to 0.2 per cent by weight As, 0.005 to 0.1 per cent by weight Se, 0.01 to 0.05 per cent by weight Sn and the remainder being lead.

2. The lead alloy of claim 1, which comprises 1.0 to 3.5 per cent by weight Sb, 0.025 to 0.2 per cent by weight As, 0.01 to 0.1 per cent by weight Se, 0.01 to 0.05 per cent by weight Sn, 0.025 to 0.1 per cent by weight Ag and the remainder lead.

3. The lead alloy of claim 1, which comprises 2.2 to 2.8 per cent by weight Sb, 0.03 to 0.06 per cent by weight As, 0.01 to 0.04 per cent by weight Se, 0.015 to 0.03 per cent by weight Sn and the remainder lead.

4. The lead alloy of claim 1, which comprises 2.2 to 2.8 per cent by weight Sb, 0.03 to 0.06 per cent by weight As, 0.1 to 0.04 per cent by weight Se, 0.015 to 0.03 per cent by weight Sn, 0.03 to 0.06 per cent by weight Ag and the remainder lead.

5. A grid for a lead storage battery comprising lead as the major constituent and about 1.0 to 3.5 per cent by weight Sb, about 0.025 to about 0.2 per cent by weight As, about 0.005 to about 0.1 per cent by weight Se, about 0.01 to about 0.05 per cent by weight Sn.

6. The grid of claim 5, which comprises in addition about 0.025 to about 0.1 per cent by weight Ag, and wherein the content of Se is from about 0.01 to about 0.04 per cent by weight.

7. The grid of claim 5, which comprises lead as the major constituent and from about 2.2 to about 2.8 per cent by weight Sb, about 0.03 to about 0.06 per cent by weight As, about 0.01 to about 0.04 per cent by weight Se, about 0.015 to about 0.03 per cent by weight Sn.

8. The grid of claim 7, which comprises in addition about 0.03 to about 0.06 per cent by weight Ag.

9. The lead alloy of claim 1, which comprises about 0.05 per cent by weight As.

10. The lead alloy of claim 1, which comprises 0.01 to 0.03 per cent by weight Sn.

11. The lead alloy of claim 10, which comprises 0.02 per cent by weight Sn.

12. The lead alloy for a gird of lead storage battery, which alloy comprises not more than 5 per cent by weight Sb, 0.025 to 0.2 per cent by weight As, 0.005 to 0.1 per cent by weight Se, 0.01 to 0.05 per cent by weight Sn and the remainder being lead.

* * * * *